United States Patent [19]

Waterkamp et al.

[11] Patent Number: 4,459,833
[45] Date of Patent: Jul. 17, 1984

[54] SWIVELING STIRRUP LOCK FOR A VEHICLE, PARTICULARLY A TWO-WHEEL VEHICLE

[75] Inventors: Manfred Waterkamp, Nottuln; Ludger Kortenbrede, Telgte, both of Fed. Rep. of Germany

[73] Assignee: Aug. Winkhaus, Telgte, Fed. Rep. of Germany

[21] Appl. No.: 285,991

[22] Filed: Jul. 23, 1981

[30] Foreign Application Priority Data

Feb. 2, 1981 [EP] European Pat. Off. ........ 81100740.0

[51] Int. Cl.³ .................. B60R 25/00; E05B 71/00
[52] U.S. Cl. ........................................ 70/227; 70/233
[58] Field of Search ............. 70/226, 227, 225, 236, 70/233, 209, 210

[56] References Cited

U.S. PATENT DOCUMENTS

| | | |
|---|---|---|
| 1,288,487 | 12/1918 | Bohan . |
| 2,366,863 | 1/1945 | Lippow . |
| 2,691,289 | 10/1954 | Wollaston . |
| 2,869,352 | 1/1959 | Naujokat ........................ 70/227 |
| 3,988,910 | 11/1976 | Widen ........................... 70/227 |
| 4,180,998 | 1/1980 | Hellman ........................ 70/227 |

FOREIGN PATENT DOCUMENTS

| | | |
|---|---|---|
| 145849 | 4/1974 | Denmark . |
| 482074 | 9/1974 | Denmark . |
| 95729 | 1/1898 | Fed. Rep. of Germany . |
| 133753 | 9/1902 | Fed. Rep. of Germany . |
| 341453 | 11/1919 | Fed. Rep. of Germany . |
| 349775 | 3/1922 | Fed. Rep. of Germany . |
| 361487 | 10/1922 | Fed. Rep. of Germany . |
| 485583 | 10/1929 | Fed. Rep. of Germany . |
| 1272944 | 8/1933 | Fed. Rep. of Germany . |
| 616301 | 7/1935 | Fed. Rep. of Germany . |
| 699356 | 11/1940 | Fed. Rep. of Germany . |
| 800629 | 11/1950 | Fed. Rep. of Germany . |
| 800630 | 11/1950 | Fed. Rep. of Germany . |
| 801127 | 12/1950 | Fed. Rep. of Germany . |
| 1755954 | 1/1972 | Fed. Rep. of Germany . |
| 2360936 | 12/1973 | Fed. Rep. of Germany . |
| 7630414 | 4/1977 | Fed. Rep. of Germany . |
| 2554276 | 6/1977 | Fed. Rep. of Germany . |
| 57721 | 11/1976 | Finland . |
| 56960 | 1/1980 | Finland . |
| 872570 | 1/1940 | France . |
| 1002281 | 10/1951 | France . |
| 144735 | 1/1980 | Norway . |
| 114204 | 5/1925 | Switzerland . |
| 233335 | 7/1944 | Switzerland . |
| 278506 | 10/1951 | Switzerland . |
| 142055 | 2/1920 | United Kingdom . |
| 260267 | 7/1927 | United Kingdom . |
| 777489 | 4/1957 | United Kingdom . |

Primary Examiner—Robert L. Wolfe
Attorney, Agent, or Firm—Toren, McGeady and Stanger

[57] ABSTRACT

At a swiveling stirrup lock, particularly for a two-wheel vehicle with a swiveling stirrup that can be swiveled through the spokes, the swiveling stirrup is supported in a swivel hub to be rotatable about its longitudinal axis. The swivel hub is supported to be swingable about a swivel axis on a pivot bearing which is to be attached at the bicycle frame. At least in the driving position, the swiveling stirrup is secured by engagement of a rotation securing element, installed at the swiveling stirrup, into a rotation securing element mounting of the pivot bearing. This engagement can be produced or released by rotating the swiveling stirrup into or out of a rotation securing position. The rotation securing element is installed according to the invention at the swiveling stirrup in the region of its outlet from the swivel hub outside the latter.

58 Claims, 19 Drawing Figures

SWIVELING STIRRUP LOCK FOR A VEHICLE, PARTICULARLY A TWO-WHEEL VEHICLE

The invention relates to a swiveling stirrup lock for a vehicle, particularly a two-wheel vehicle, with a swiveling stirrup which is supported at a frame portion laterally next to a wheel which is provided with an opening and which is swingable about a swivel axis between a locking position in which the stirrup penetrates the opening of the wheel and is locked against swiveling, and a driving position in which it is disengaged from the wheel and is secured against swiveling, wherein the swiveling stirrup is supported in a swivel hub to be swingable about an axis of rotation (its longitudinal axis), and the swivel hub is supported to be swingable about the swivel axis on a pivot bearing which is to be attached to the frame. The swiveling stirrup is secured at least in the driving position by engagement of a rotation securing element, installed at the swiveling stirrup, into a rotation securing element mounting of the swiveling stirrup and this engagement can be produced or released by rotating the swiveling stirrup into or out of a rotation securing position.

Such a swiveling stirrup lock is known from prior public use, however, it has not been determined whether it was also used in the U.S. In the known embodiment, at the free end of the swiveling stirrup a rotation locking element is installed for engagement into a rotation locking element mounting of a locking bearing which is arranged on the opposite wheel side. In this known embodiment, the swiveling stirrup is secured in the driving position by means of the interaction of the rotation locking element at the free end of the swiveling stirrup with a mounting which is arranged at an extension part of the pivot bearing which projects over the entire length of the swiveling stirrup.

In this way the pivot bearing becomes massive, is expensive due to the high material consumption, requires much space and is of very unfavorable appearance.

The invention is based on the task to create a swiveling stirrup lock of the type described above in such a way to make possible a significant reduction in materials and space requirement for the pivot bearing.

For the solution of this task it is suggested that the rotation securing element at the swivel stirrup is installed in the region of its outlet from the swivel hub outside the latter. Consequently, in the embodiment according to the invention the rotation securing element mounting can be installed at the pivot bearing in close proximity of the swivel hub and no arm is required to install a rotation securing element mounting at the pivot bearing which interacts with the free end of the stirrup.

It is indeed also known from prior public use to install a securing mechanism for the swiveling stirrup and the hub which carries it close to the pivot bearing and the swivel hub with relatively little space requirement. But here this securing mechanism is installed inside the swivel hub completely covered which leads to a complicated construction which is difficult to manufacture and is subject to breakdown.

In the embodiment according to the invention, the swiveling stirrup can be prestressed about its axis of rotation in direction to the rotation securing position by means of a rotation prestressing element so that the rotation securing element can be held by spring tension in the rotation securing element mounting and the swiveling stirrup can thus be secured in the driving position. But this is not an absolutely necessary feature, it is rather also possible to lock the swiveling stirrup in its rotation securing position by means of a suitable locking mechanism, such as a lock.

According to a preferred embodiment of the invention, locking of the swivel hub in the locking position is guaranteed by the engagement of a rotation locking element, installed at the locking stirrup, in a rotation locking element mounting. The rotation locking element may optionally be arranged in the region of the outlet of the swiveling stirrup from the swivel hub and may optionally be identical with the rotation securing element. In the case of arranging the rotation locking elements close to the swivel hub at the swiveling stirrup, the rotation locking element mounting can be installed in a similar manner, appropriately angularly offset at the pivot bearing near the swivel hub, and under certain circumstances a locking bearing to receive the free end of the swivel stirrup will not be necessary. This is the optimum embodiment considering the material expenditure, manufacturing effort and space requirement, however, it may not be adequate in all cases for the safety requirements so that it is definitely within the scope of the invention to install in addition and/or exclusively a rotation locking element at the free end of the swiveling stirrup and to let this rotation locking element interact with a rotation locking element mounting of a locking bearing which is installed at a place through the opening of the wheel, opposite the pivot bearing. In any case to complete the swivel lock effected by the rotation locking element and the rotation locking element mounting, for locking of the swiveling stirrup in the locking position, a rotation lock must be added which permits locking the swiveling stirrup in the rotation locking position which corresponds to the engagement of the rotation locking element in the rotation locking element mounting so that this swiveling stirrup can only be rotated after releasing this rotation lock to lift the rotation locking element out of the rotation locking element mounting into a rotation release position, if appropriate against the action of the rotation prestressing element, and only then is it possible to swivel the swiveling stirrup about the swivel axis from the locking position into the driving position.

The rotation securing position of the swiveling stirrup may correspond to the rotation locking position so that the swiveling stirrup is also locked in the rotation securing position by the rotation lock. This is one of the cases in which a rotation prestressing element may become superfluous for prestressing of the swiveling stirrup into its rotation securing point.

According to a preferred embodiment of the invention, the rotation lock is formed by a lock supported in the swivel hub, particularly a lock cylinder. The lock cylinder housing is then preferably included in the swivel hub and the swiveling stirrup is rigidly connected for rotation with the cylinder core, wherein the possibly existing rotation prestressing element may be formed by a helical torsion spring which is installed inside the swivel hub. The helical torsion spring is arranged concentrically with respect to the cylinder core, and the swiveling stirrup lock and is supported with one end at the swivel hub and with the other end at the cylinder core or the swiveling stirrup.

In the lock cylinders of the known type the cylinder core is locked with respect to the cylinder housing by removing the key, wherein this removal is only possible in one position, i.e. in that position in which the tumbler peg bores of the cylinder core and the tumbler peg bores of the cylinder housing are aligned. When the key is removed, then the cylinder core is locked in this rotational position against further rotation. To apply this to the solution according to the invention means that the key of the lock cylinder must be removable at least in the rotation locking position of the swiveling stirrup. The rotation locking position which is determined by the engagement of the rotation locking element in the rotation locking element mounting therefore must coincide with that position of the cylinder core with respect to the cylinder housing in which the key can be removed.

Regarding the rotation securing position of the swiveling stirrup which is determined by the engagement of the rotation securing element with the rotation securing element mounting, according to the invention this rotation securing position of the swiveling stirrup can be adjusted by appropriate dimensioning of the rotation securing element and the rotation securing element mounting in such a way that the key can be removed in the rotation securing position of the stirrup when the stirrup is in the driving position. This is, for instance, advantageous in order to prevent that perhaps playing children remove the key when the lock is not locked and the key not removed, possibly after preceding locking of the lock. But it is also conceivable to adjust the rotation securing position by appropriate dimensioning of the rotation securing element and the rotation securing element mounting in such a way that it is not yet possible to pull the key in the rotation securing position. This offers the advantage that the key remains in the swiveling stirrup lock when the wheel is not secured and therefore the key cannot be lost.

In view of a simple, material saving, space saving and attractive embodiment of the lock according to the invention the swivel hub can be constructed with an outer rotary surface about the swivel axis which extends over at least a part of the periphery, and at the pivot bearing an engagement wall which rests against this rotary surface can be installed, and the rotation securing element mounting and possibly a rotation locking element mounting can be constructed on the edge of the engagement wall. The pivot bearing may have the shape of a circular plate which is cup-shaped at part of its periphery wherein the cup wall serves as the engagement wall.

The rotation securing element and optionally also a rotation locking element on the hub side may be created by a recess in the swiveling stirrup. The same recess may possibly also result in the rotation securing element and the rotation locking element. It is, however, also possible that the rotation securing element and again possibly also a rotation locking element on the hub side are formed by a projection of the swiveling stirrup, wherein also in this case one and the same projection may be the rotation securing element as well as the rotation locking element.

In view of a great ease in operation, the swivel hub can be prestressed by means of a swivel prestressing element in direction towards a swivel end position. For instance, the swivel hub can be prestressed in direction towards the driving position. To make the bicycle ready for operation, merely the rotation lock has to be released and the swiveling stirrup has to be rotated from the rotation locking position to the rotation release position in which the rotation locking element is disengaged from the rotation locking element mounting and subsequently, due to the swivel prestressing, the swiveling stirrup is automatically swiveled in direction towards the driving position. Instead of a special swivel prestressing element, the mass distribution of the unit which consists of the swiveling stirrup and the swiveling stirrup hub can be selected in such a way that the swiveling stirrup is prestressed by gravity in direction towards its driving position.

A possibly provided swivel prestressing element can be installed in a covered manner between the pivot bearing and the swivel hub which reduces the susceptibility to failure as well as promotes a good appearance.

According to a preferred embodiment, the swivel prestressing element is formed from a spiral tension spring which is held in a curved duct about the swivel axis and this spiral tension spring engages on one side at the pivot bearing and at the other side at the swivel hub.

In order to make it easy to install the swivel prestressing element within the space defined by the swivel hub and the swivel part and to apply at the same time an initial stress into the spring, it is recommended that the swivel prestressing element engages with one end at a loose anchoring member which is preassembled together with the swivel prestressing element at the swivel hub or the pivot bearing and during assembly of the swivel hub and the pivot bearing engages in a form-locking manner with the pivot bearing or the swivel hub after having received the initial tension.

If a rotation prestressing element is provided, care can be taken that the swiveling stirrup, after rotation from the rotation locking position to the rotation release position and swiveling of the swivel hub from the locking position on the following swivel distance up to the driving position, is held in the release position by means of a curved sector of the pivot bearing which precedes the rotation securing element mounting against the effect of the rotation prestressing element in such a way that the swiveling stirrup only jumps in the rotation securing position after reaching the driving position under the action of the rotation prestressing element while simultaneously the rotation securing element enters into the rotation securing element mounting, wherein the engagement of the rotation securing element into the rotation securing element mounting under the action of the rotation prestressing element even supports the approach of the swiveling stirrup to the driving position. Regarding the ease of operation, this embodiment is interesting insofar as after releasing the rotation lock one only has to bring the swiveling stirrup into the rotation release position and subsequently swivel it, without requiring any other manipulations at the rotation lock, particularly at a lock cylinder, in order to secure the swiveling stirrup in the driving position.

In addition to the advantage of the ease of operation, this solution offers an additional decisive advantage when combined with a prestressing element which prestresses the swiveling stirrup in direction towards the driving position. In such an embodiment the swiveling stirrup jumps, after release of the rotation lock and rotation of the swiveling stirrup into the rotation release position, automatically up to the driving position and then rotates into the rotation securing position so that the rotation protection is guaranteed. A stable intermediate position of the swiveling stirrup in which the stirrup is on the one hand not yet secured and on the other hand does not yet engage in the opening of the wheels is not conceivable in this embodiment so that the danger is excluded that the user of the vehicle could start while the swiveling stirrup is not secured and the swiveling stirrup could, as a result of vibrations, engage in the opening of the wheel in a blocking and destructive manner. The curved sector can be constructed at the engagement wall at which also the securing element mounting and optionally the locking element mounting are constructed.

But even if no swivel prestressing of the swiveling stirrup in direction towards the driving position is provided, a reliable protection can be obtained against the unsecured swiveling stirrup allowing a start of the vehicle, but then due to vibration engaging in the opening of the wheel. This can be accomplished in that the swiveling stirrup, after releasing the rotation locking element from the rotation locking element mounting during the swivel distance of the swivel hub from the locking position into the driving position, can be restored by the rotation prestressing element into the rotation securing position, and that at the pivot bearing a rotation securing element stop is installed against which the rotation securing element on the swivel distance of the swiveling stirrup before reaching the driving position strikes in a stop position in which the swiveling stirrup still engages in the opening of the wheel. In this embodiment, which, by the way, is not bound to the lack of a swivel prestressing element, one must consequently inevitably rotate before starting the vehicle the swiveling stirrup from the rotation locking position into the rotation release position and then into the driving position and secure it so that the bicycle can start at all. This rotation securing element stop can also be constructed at the already mentioned engagement wall.

As an additional safety measure against an unsecured swiveling stirrup engaging in the moving wheel, care can be taken that during the swivel distance of the swiveling stirrup between the stop position and the driving position another stable position is not possible in that the rotation securing element by engagement with the rotation securing element mounting or the rotation securing element stop under the action of the rotation prestressing element tries to swivel the swiveling stirrup from each intermediate position either into the driving position or into the stop position. The prevention of such a stable intermediate position can be achieved in that merely a sharp or rounded point is left on the engagement walls between the rotation securing element stop and the rotation securing element mounting.

While, in the solutions known so far the pivot bearing and the locking bearing are arranged on a stirrup which carries and connects the two bearings, and the stirrup is installed on the one side of the vehicle for instance at the back fork of a bicycle, it is suggested according to a particularly essential feature of the invention which is not bound to the remaining features of the invention that the locking bearing is installed separately from the pivot bearing at another part of the frame than the pivot bearing. This embodiment saves material and promotes a good appearance. So far one was of the opinion that the pivot bearing and the locking bearing would definitely have to be held together for reasons of simplified assembly even before they are installed at the bicycle frame. But surprisingly, it was found that, in any case in the installation of the swivel stirrup lock, in the factory of the first equipper the swivel bearing and the locking bearing can also be installed separately without making the assembly more difficult.

According to an embodiment of the invention, the locking bearing has a chamber with an inlet slot which permits passage of the free end of the swiveling stirrup only in the rotation release position, and with a receiving space which, after passage of the free end of the swiveling stirrup through the inlet slot, permits a rotation of a latch installed at the free swivel stirrup end into a position which corresponds to the rotation locking position in which the latch engages behind the inlet slot boundary and in this way the locking bearing is secured even against a strong application of force. According to a preferred development, the inlet slot is constructed in two steps as viewed in the direction of the locking stirrup which is in the locking position. There is a first, wider slot step which is closer to the swivel hub and which takes up the full stirrup cross-section, and then following is a second slot step which is further removed from the pivot bearing which only permits passage of the flattened end of the swiveling stirrup which carries the latch. In this embodiment access to the flattened end of the swiveling stirrup is made more difficult by the first slot step, which means that a rotary tool cannot be applied at the swiveling stirrup.

In view of the above-mentioned possibility to install the pivot bearing and the locking bearing separately at the vehicle frame, it is advantageous when the receiving space is wider in the longitudinal direction of the swivel bolt in its locking position than the latch in accordance with the fluctuations in distance which are to be expected between the pivot bearing and the locking bearing. In this connection it must be pointed out that, for instance, when the swivel stirrup lock is installed at the back fork of bicycles, the distance between the fork sides may vary depending on which hub is installed in the back fork. Therefore the separate construction of pivot bearing and locking bearing is of special interest and also the measures are of interest which permit an interaction of the swiveling stirrup and the locking bearing, even when the distance between the pivot bearing and the locking bearing varies.

The invention also relates to various versions of the swiveling stirrup lock which are suitable for supplementary installation into a bicycle which has already left the factory.

A first possible supplementary installation version provides that the pivot bearing and the locking bearing are arranged at a U-stirrup for attachment at a wheel fork in such a way that the U-stirrup engages around the wheel rim and is directed with its U-sides essentially towards the wheel axle. This U-stirrup may be constructed for detachable fastening at the wheel fork. The attachment at the sides of the wheel fork may be based on that the fastening means for detachable fastening of the U-stirrup are installed at the wheel fork in the region of the sides of the U-stirrup. To be prepared for the wheel fork widths which change from manufacturer to manufacturer, the fastening means at at least one of the sides can be adjustable in direction towards the U-bight.

In order to make it possible that the fastening means can be adjusted at the sides of the U-stirrup, oblong holes which extend in direction of the bight can be installed at these sides for the adjustable holding of fastening means.

According to a preferred embodiment, the fastening means are formed by open claws which engage around the respective wheel fork sides and which are adjustable vertically to the plane of the U-stirrup by clamping means so that they press the U-stirrup against the wheel fork side.

The clamping means may be tightening screws which penetrate the respective oblong hole, have at the respective exposed side of the U-stirrup a tool engagement and are screwed to the claws at the side of the wheel fork.

The range of variation of the fastening means can be increased in view of the varying spaces of the wheel fork sides in that the claws, including the tightening screws, are rotatable by 180° above the axis of the respective tightening screw so that the claws can engage around the wheel fork sides from the inside or from the outside, as selected.

The pivot bearing and/or the locking bearing may be manufactured in one piece with the U-stirrup, for instance of malleable cast iron. It is, however, also possible to attach the pivot bearing and/or the locking bearing on the U-stirrup by welding.

To give the swiveling stirrup lock an attractive appearance and make it pleasant to touch, the U-stirrup may be sprayed with plastic. The plastic spraying may extend, if appropriate, over parts of the pivot bearing and/or the locking bearing.

Particularly in view of a subsequent spraying, an embodiment of the U-stirrup with a double T-shaped cross-section of the U-stirrup is of interest.

It is also possible that the U-stirrup has a U-shaped cross-section. In this case, the U-shaped cross-section of the U-stirrup may be filled with a filler which is appropriately U-shaped. This filler which extends in the form of a U may itself have a U-shaped or T-shaped cross-section.

A supplementary installation of a swiveling stirrup lock according to the invention into a bicycle which has already left the factory is also possible by attaching the pivot bearing and/or the locking bearing individually at always one side of a wheel fork by means of a clamping device.

According to a preferred embodiment of this concept the clamping device includes a U-shaped clamp strap which has at its free side ends claws which hook into the undercuts at the pivot bearing or the locking bearing. In the top of the U-shaped clamp strap a threaded bore is provided to receive a tightening screw which can be pressed against the respective wheel fork side in such a way that the claws are braced with the undercuts. In detail this may have the appearance that the pivot bearing or the locking bearing has a contact ring which faces the respective fork side and serves for contact at the respective fork sides and that this ring has at its inside an undercut which goes all around, with diametrically opposite insertion slots for the claws in such a way that the claws can be inserted in the region of the insertion slots up to the depth of the undercut in the contact ring and the pivot bearing or locking bearing is rotatable with respect to the U-shaped clamp strap, wherein the claws engage in the undercuts.

In order to prevent an unauthorized release of the pivot bearing and/or the locking bearing, the respective clamping device may have a tightening screw with a tool engagement which can break off, preferably as a result of the torque which occurs during tightening.

In order to take the problem of different inside widths of the wheel forks into account, in the embodiment in which the pivot bearing and the locking bearing are attached individually at the respective sides of the wheel fork, the pivot bearing and the locking bearing can be made adjustable at a different distance from the wheel axle. In this way an excessive length of the swiveling stirrup compared to the inside width of the wheel fork can be compensated. But it will then frequently be necessary that at least one of the bearings—pivot bearing and locking bearing—can be fixed in the plane of the wheel fork in different angular positions in such a way that the swiveling stirrup is in alignment in the locking position with the locking bearing.

It is, of course, also possible to utilize the usually diverging course of the sides of the wheel fork to adapt a specific swiveling stirrup lock to the respective inside widths of the sides of the wheel fork. However, this possibility is not sufficient in all cases because the inside widths of wheel forks vary to a great extent. For this reason the solution of a different distance of the individual bearing from the wheel axle is of considerable interest.

The clamping device may be covered by means of a cap which can be snapped onto the pivot bearing and the locking bearing.

The enclosed figures elucidate the invention with the aid of exemplified embodiments. The figures show.

Figure 1:
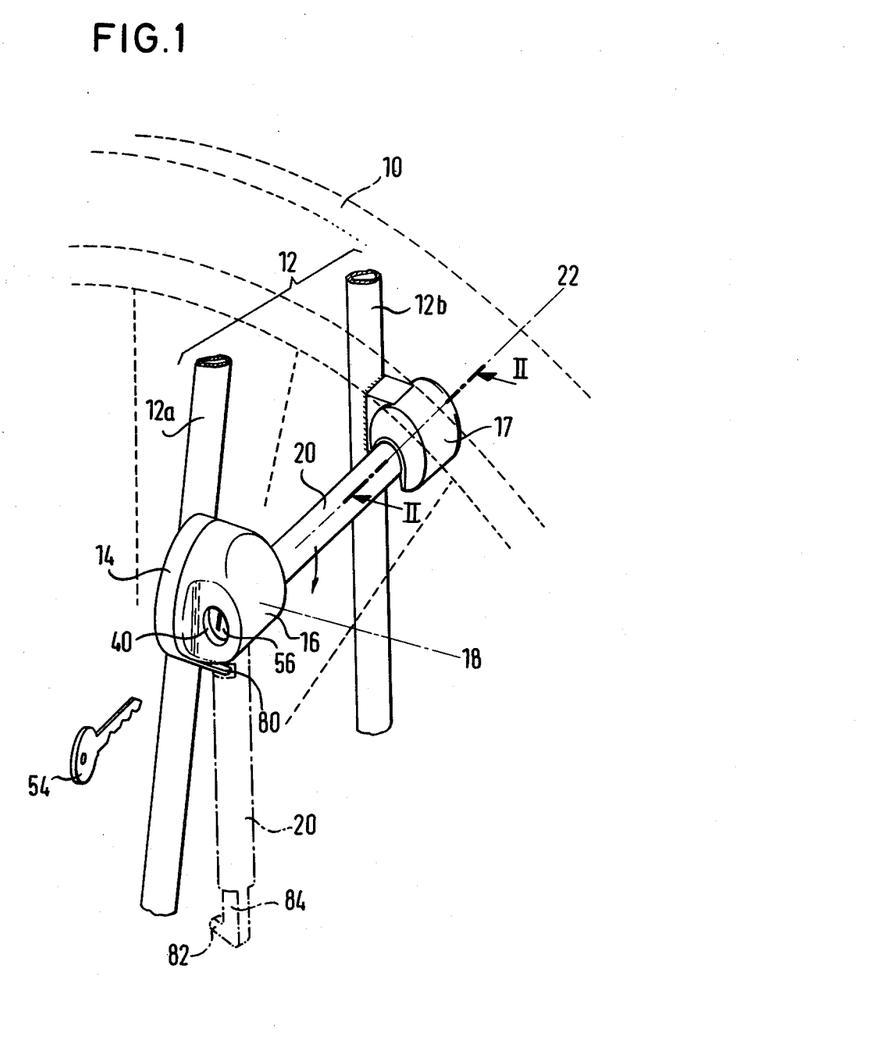
FIG. 1 a perspective view of the swiveling stirrup lock according to the invention at a bicycle.

FIG. 1 shows the rear wheel 10 of a bicycle equipped with spokes and the back fork 12 with the fork sides 12a and 12b which receive this rear wheel. A pivot bearing 14 is welded to the fork side 12a and a locking bearing 17 to the fork side 12b. On the pivot bearing 14 a swivel hub 16 is swingably supported about a swivel axis 18. In the swivel hub 16 a swiveling stirrup 20 is supported to be rotatable about its longitudinal axis 22 and the longitudinal axis intersects the swivel axis.

Figure 5:
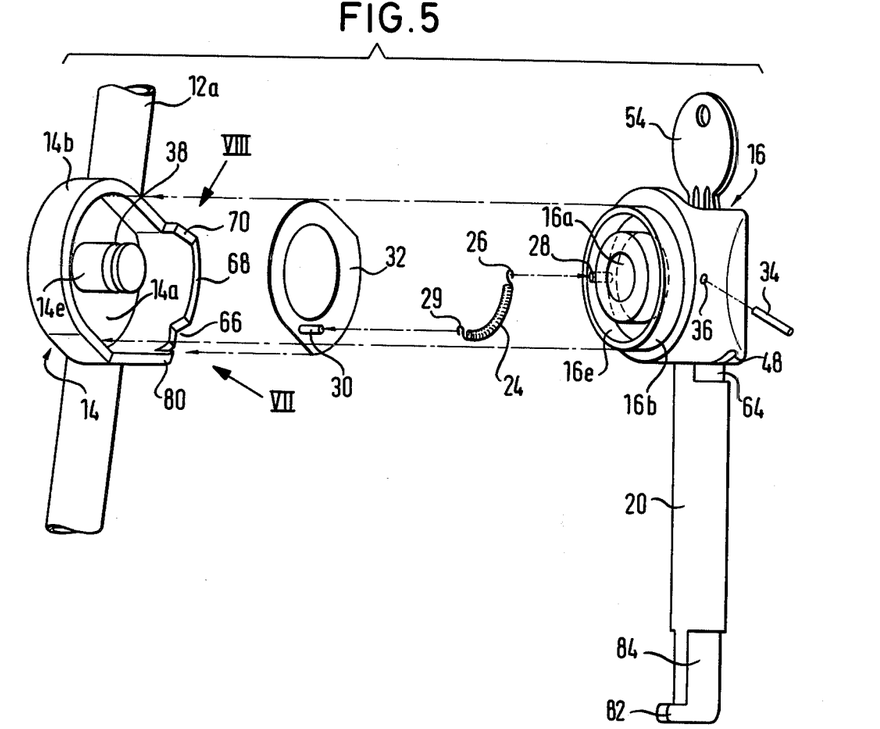
FIG. 5 a perspective view of the pivot bearing and the swivel hub with the swiveling stirrup taken apart.
Figure 6:
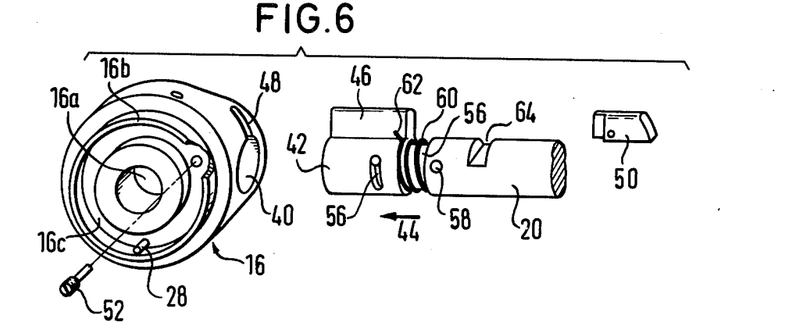
FIG. 6 a perspective view of the swivel hub taken apart.

The construction of the pivot bearing and the swivel hub is shown in detail in FIGS. 5 and 6. The pivot bearing 14 is formed by a pivot bearing plate 14a which is firmly welded to the frame side 12a. The pivot bearing plate is enclosed in a cup-like manner by an engagement wall 14b. A swivel lug 14c projects from the center of the swivel bearing plate 14a. The swivel hub 16 has a swivel bore 16a which takes up the swivel lug 14c. In addition, the swivel hub has an annular extension 16b which is intended for contact at the inner peripheral area of the engagement wall 14b, and inside the annular extension 16b a curved duct 16c is constructed which is concentric to the swivel lug 14c and the swivel bore 16a. This curved duct 16c is intended to receive a prestressing spring 24. The prestressing spring is hooked with its one end 26 at a lug 28 which is arranged in the hub 26 at the bottom of the curved duct 16c. The other end 29 of the helical spring 24 is hooked in at a lug 30 which is installed at an anchoring disk 32. The anchoring disk 32 has the same non-circular outline as the engagement wall 14b of the pivot bearing 14. For assembly the hook 26 is hooked into the lug 28 and the hook 29 into the lug 30 and the anchoring part 32 is brought to rest against the hub 16. Then the hub 16 is pushed onto the pivot bearing 14 wherein, due to appropriate rotation of the anchoring part 32, the spring 24 is kept prestressed. The anchoring part 32 then engages inside the outline of the engagement wall 14b so that the initial stress remains. Subsequently a securing peg 34 is driven into a bore 36 of the swivel hub 16 which engages into a circumferential groove 38 of the swivel lug 14c but does not hinder rotation of the swivel hub with respect to the pivot bearing 14.

A profile lock cylinder 42 with a cock profile is inserted in a diametrically extending duct 40 of the swivel hub. The duct 40 is connected over part of its length (see FIG. 6) also with a cock profile, but emerges at the other end (see FIG. 1) as a round duct. As shown in FIG. 6, the profile cylinder 42 is inserted in direction of the arrow 44 until the profile web 46 strikes the end of the duct portion 48. Then a locking member 50 is inserted into the open end of the duct portion 48 and fixed by means of a setscrew 52. The profile cylinder has a core 56 which can be rotated with a key 54 (FIG. 1). At the right end of the core 56 in FIG. 6 the swiveling stirrup 20 is connected to the cylinder core 56 rigidly for rotation by means of a splint or split pin 58 and in axial alignment with the cylinder core 56. A helical torsion spring 60 is anchored with its one end in the cylinder core 56 (not shown) and has another end 62 which is intended for contact at the duct portion 48. When the lock cylinder 42 is installed in the duct 40, the helical torsion spring 62 is prestressed.

Figure 7:
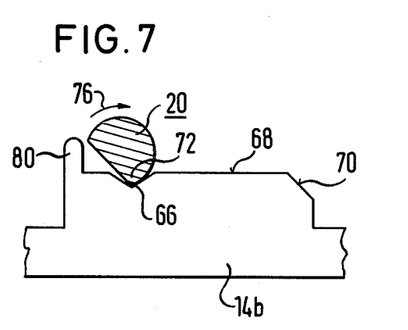
FIG. 7 the engagement of the rotation securing element of the swiveling stirrup in the rotation securing element mounting.

As evident particularly in FIGS. 5 and 7, a recess 64 is provided at the swiveling stirrup 20, directly adjoining at the hub, however, outside this swivel hub 16. At the engagement wall 14b, as evident in FIG. 7 (FIG. 7 shows a development of the engagement wall 14 in the range which can be recognized when viewing in direction VII according to FIG. 5) a rotation securing element mounting is worked in the form of a notch 66. A curved sector 68 follows this notch 66, and following this curved sector 68 there is a rotation locking element mounting in the form of a steeply inclined side 70. A corner 72 is formed at the swiveling stirrup 20 due to this recess 64 and this corner acts primarily as rotation securing element, but also as rotation locking element.

Figure 8:
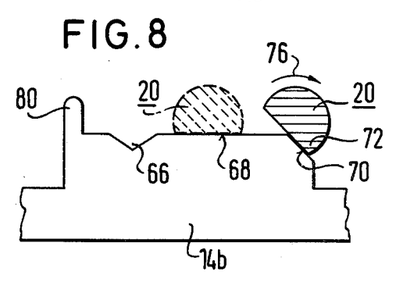
FIG. 8 the engagement of the rotation securing element which serves as an additional rotation locking element into an additional rotation securing element mounting.

In FIG. 7 the rotation securing element 72 engages in the rotation securing element mounting 66. This position corresponds to the position of the swiveling stirrup 20 which is shown in FIG. 1 with a dash-dot line. The initial stress generated by the helical torsion spring 60 tries in FIG. 7 to rotate the rotation securing element 72 into the rotation securing mounting 66. The rotation position of the swiveling stirrup 20 shown in FIG. 7 is called the rotation securing position. This rotation securing position can be set in such a way that the key of the lock cylinder 42 can be pulled out and thus the swiveling stirrup 20 is fixed so that it cannot rotate. In this case the rotation securing element 72 cannot leave the rotation securing element mounting 66 at all. But it is also conceivable that the rotation securing position according to FIG. 7 does not permit a withdrawal of the key 54 from the lock cylinder 42. In this case the engagement of the rotation securing element 72 in the rotation securing element mounting 66 is guaranteed by the spring tension of the helical torsion spring 60. When the swiveling stirrup 20 is in the rotation securing position according to FIG. 7, then the swiveling stirrup 20 cannot be swiveled from the position shown in FIG. 1 with a dash-dot line into the position shown with a solid line. In the position shown in FIG. 1 with a dash-dot line, i.e., the driving position, the swiveling stirrup 20 is disengaged from the wheel 10. In order to be able to swivel the swiveling stirrup into the position shown in FIG. 1 with a solid line, the swiveling stirrup 20 must first be rotated out of the rotation securing position according to FIG. 7 by rotating it against the action of the helical torsion spring 60 so that the rotation securing element 72 leaves the rotation securing element mounting 66. Only then the stirrup can be swiveled wherein the rotation securing element 72 moves over the curve 68 until the rotation securing element 72 which now acts as the rotation locking element falls into the rotation locking element mounting, i.e. behind the side 70. After the rotation locking element 72 has passed the side 70, the swiveling stirrup 20 can rotate so far in the direction of the arrow 76 under the effect of the helical torsion spring 60 that the swiveling stirrup reaches a rotation locking position. In this rotation locking position the cylinder core 56 has reached an angular position with respect to the housing of the lock cylinder 42 in which the key 54 can be pulled out so that the swiveling stirrup 20 now can no longer be rotated. The swiveling stirrup 20 then is in the position shown with a solid line in FIG. 1 and since it can no longer be rotated due to the engagement of the rotation locking element 72 in the rotation locking element mounting 70 it can also no longer be swiveled. The wheel is locked. FIG. 8 shows the engagement of the rotation locking element 72 in the rotation locking element mounting 70. FIG. 8 shows a partial development of the engagement wall 14b in the direction of the arrow VIII in FIG. 5.

If a bicycle is to be unlocked, then the key 54 must again be inserted. Then the swiveling stirrup 20 can be rotated with the aid of the key against the action of the helical torsion spring 60 from the rotation locking position according to FIG. 8 into the rotation release position which is also shown in FIG. 8 but with a broken line, wherein the rotation securing element 72 slides over the curved section 68 and finally engages again in the rotation securing element mounting 66 under the action of the helical torsion spring 60. A point 80 arranged at the engagement wall 14b prevents a continued movement of the swiveling stirrup 20 beyond the position shown in FIG. 1 with a dash-dot line.

Figure 2:
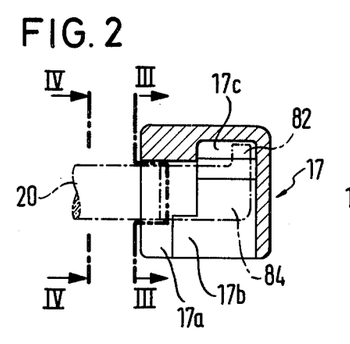
FIG. 2 a section according to line II—II of FIG. 1.
Figure 3:
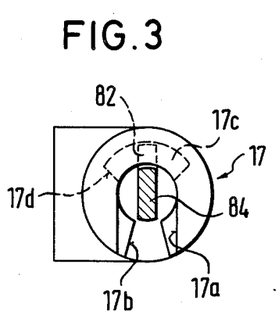
FIG. 3 a section according to line III—III of FIG. 2.
Figure 4:
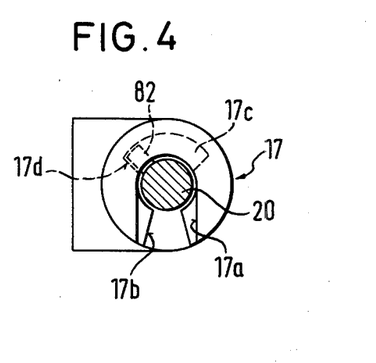
FIG. 4 a section along line IV—IV of FIG. 2.

Since, due to the long lever arm of the swiveling stirrup 20, locking of the swiveling stirrup 20 in the locking position shown in FIG. 1 alone by means of engagement of the rotation locking element 72 in the rotation locking element mounting 70 according to FIG. 8 may be insufficient and it could in extreme cases still be possible to forcefully break open the swiveling stirrup lock, the locking bearing 17 is provided. This locking bearing interacts with a latch 82 at the free end of the swiveling stirrup 20 (see FIG. 1). The locking bearing and the interacting latch are shown in detail in FIGS. 2 to 4. The locking bearing has a two-step inlet slot 17a,17b with a first wider step 17a and a second narrower step 17b. A receiving space 17c adjoins upwardly at the narrower step 17b of the slot. The wider slot step 17a is dimensioned in such a way that it can take up and guide, as shown in FIG. 2, the complete round cross-section of the swiveling stirrup. The end region of the swiveling stirrup is, as shown in FIGS. 1 and 2, identified with 84 and is flattened on both sides by milling. This flattened end region 84 can just pass the narrower slit step 17b when the swiveling stirrup, as shown in FIG. 3, is in the rotation release position in which it can be held against the action of the helical torsion spring 60 by rotating the key 54. When the swiveling stirrup 20 can enter the locking bearing 17, as shown in FIG. 3, and the key is released, then the swiveling stirrup can rotate into the rotation locking position which is shown in FIG. 4. In this rotation locking position the key can again be pulled out so that the swiveling stirrup can no longer be rotated. The exit of the swiveling stirrup from the locking bearing 17 is then locked because, for one, the flattened end section 84 can no longer pass through the narrower slot 17b and, secondly, the latch 82 rests against a contact surface 17d of the receiving space 17c. As evident in FIG. 2, the complete cross-section of the swiveling stirrup immerses so far into the slot 17a that it is impossible to reach the flattened section 84 with a rotary tool and to rotate the swiveling lever by destroying the lock cylinder 42.

The modification according to FIGS. 9 to 12 corresponds in part to the embodiment according to FIGS. 1 to 8; inasfar as they conform, analogous parts are provided with the same reference numbers, always adding 100.

Figures 9, 10:
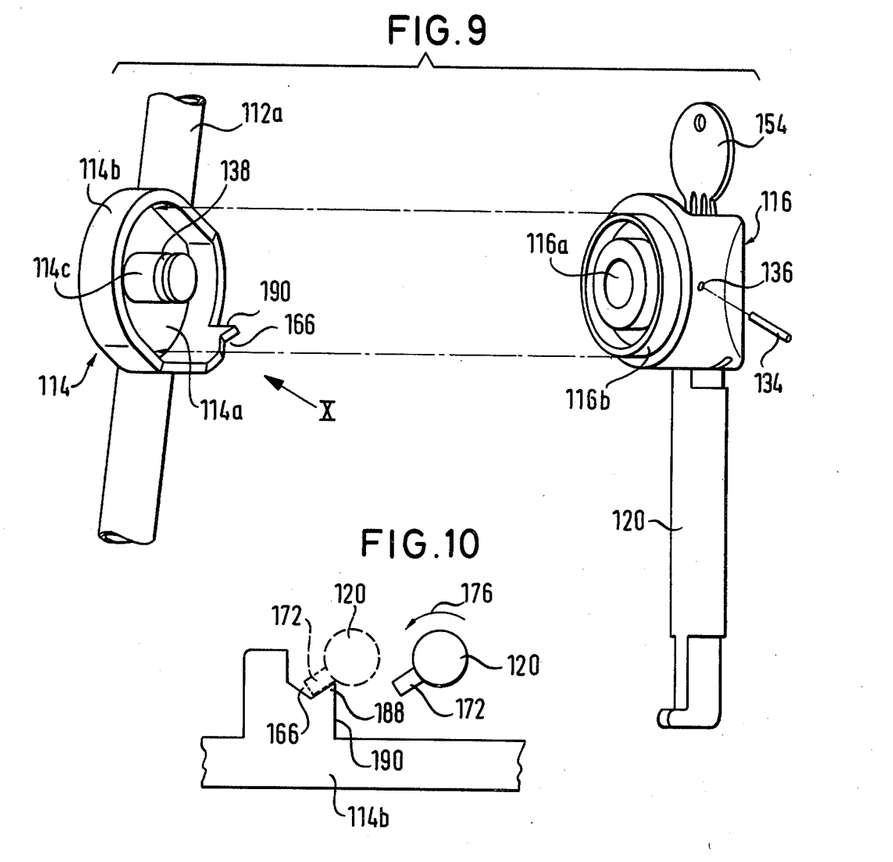
FIG. 9 a modified embodiment of the invention.
FIG. 10 the rotation securing element and rotation securing element mounting in the embodiment according to FIG. 9.
Figure 11:
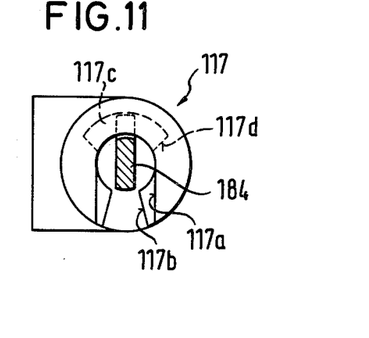
FIGS. 11 and 12 sections according to FIGS. 3 and 4 in the embodiment according to FIGS. 9 and 10.
Figure 12:
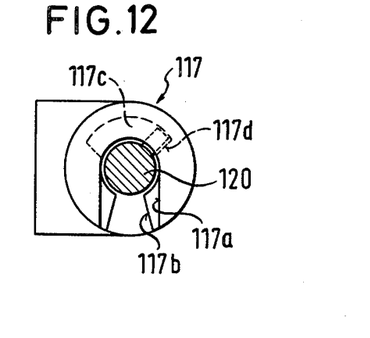

In the modification of the embodiment according to FIGS. 1 to 8 in the embodiment according to FIG. 9 the spiral tension spring which serves as swivel prestressing element is omitted and also the auxiliary parts which belong to this spiral tension spring are omitted. FIG. 10 represents a development of the engagement wall 114b viewed in direction of the arrow X. In FIG. 10 again the rotation securing element mounting 166 is evident which is of similar construction as in FIG. 7. However, the rotation securing element 172 is of different construction; it is constructed as a projection beyond the completely round outline of the swiveling stirrup 120. The curved section and the rotation locking element mounting are also omitted. A rotation securing element stop 190 adjoins and is separated from the rotation securing element mounting 166 by a point 188. The direction of pretensioning indicated with the arrow 176 is reversed compared to the embodiment according to FIGS. 1 to 8. Locking in the embodiment according to FIGS. 9 to 12 takes place solely at the point of the locking bearing 117; the locking position is shown in FIG. 12. To release the swiveling stirrup lock, the swiveling stirrup is brought into the rotation release position according to FIG. 11 in which the end of the swiveling stirrup can leave the locking bearing 17. When now the swiveling stirrup falls from the position shown in FIG. 1 with a solid line down to the position shown with a dash-dot line, wherein a release of the key is assumed, then the swiveling stirrup 120 rotates back into the rotation securing position which is shown in FIG. 10 and this is due to the action of the still provided helical torsion spring according to FIG. 6. When the swiveling stirrup in this rotation securing position approaches the position which in FIG. 1 is shown with a dash-dot line, then the rotation securing element 172 pushes against the rotation securing element stop 190. The thus resulting swivel position of the swiveling stirrup 120 shall be defined as the stop position. In this stop position the rotation securing element 172 cannot enter into the rotation securing element mounting 166. Care has been taken that in the stop position the swiveling stirrup 120 still engages into the spokes of the wheel 10. Therefore, the wheel cannot be started in this position of the swiveling stirrup. In order to be able to start the wheel, the swiveling stirrup must be brought into the rotation securing position shown in FIG. 10 with a broken line which corresponds to the driving position shown in FIG. 1 with a dash-dot line. For this it is necessary to rotate the swiveling stirrup 120 from the rotation securing position which is shown in FIG. 10 with a solid line against the action of the helical torsion spring, i.e. in the direction opposite the arrow 176, until the rotation securing element 172 can pass over the point 188. Then the swiveling stirrup 120 is swiveled into the driving position according to FIG. 1 and the rotation securing element 172 can fall into the rotation securing element mounting 166 as shown in FIG. 10 with a broken line. Then the swiveling stirrup is in the driving position and is also secured. This protection can either be based only on the spring tension of the helical torsion spring according to FIG. 6, however, also the rotation securing element 172 and the rotation securing element mounting 166 can be adjusted to one another in such a way that in the position shown in FIG. 10 with a broken line the key can be pulled out and the swiveling stirrup 120 consequently can no longer be rotated.

As shown in FIG. 1, the pivot bearing 14 and the locking bearing 17 are welded separately to the fork sides 12a, 12b, or are attached in another manner. In order to facilitate installation of the pivot bearing and the locking bearing, it is possible to connect the pivot bearing 14 and the locking bearing 17 while the swivel hub 16 is removed by means of an assembly connector which forces the correct mutual coordination of the pivot bearing 14 and the locking bearing 17. This assembly connector can also permit a certain axial sliding of the locking bearing 17 in relation to the pivot bearing 14 to the same extent in which also the latch 82 is narrower than the receiving space 17c.

The assembly connection may be a simple and inexpensive plastic part which already during storage and transportation connects correlated pivot bearings 14 and locking bearing 17 and after their assembly at the frame can be removed and thrown out so that subsequently the swivel hub 16 with the swiveling stirrup 20 can be installed on the pivot bearing 14. It is easily possible to construct the assembly connector in such a way that it does not hinder welding or other fastening of the pivot bearing 14 and the locking bearing 17.

Figure 13:
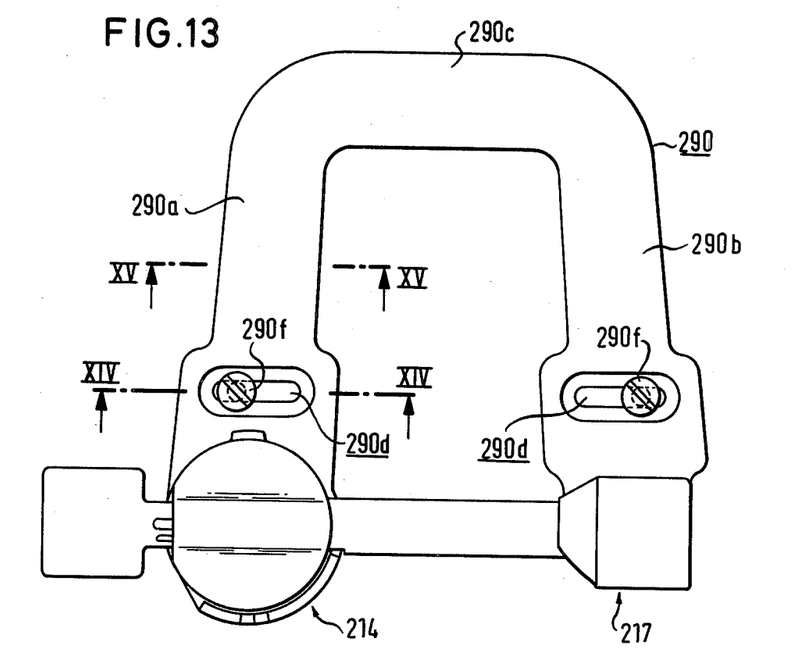
FIG. 13 a swivelling stirrup lock according to the invention in which the pivot bearing and the locking bearing are attached at a U-stirrup.
Figure 14:
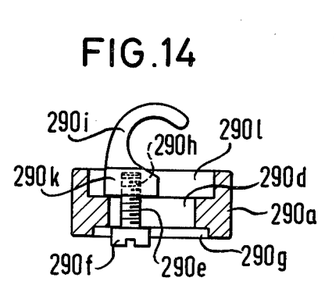
FIG. 14 a section along line XIV—XIV of FIG. 13.

In FIG. 13 analogous parts are provided with the same reference numbers as in the embodiments according to FIGS. 1 to 8, always adding 200. The pivot bearing 214 and the locking bearing 217 are installed in the embodiment according to FIG. 13 at a U-stirrup 290, i.e. at the sides 290a and 290b of the U-stirrup which are connected by means of a bight 290c. In the sides 290a and 290b of the U-stirrup 290 two stepped oblong holes 290d are arranged which extend parallel to the bight 290c. The oblong holes 290d are penetrated by tightening screws 290e whose tool engagement head 290f lies in the one outer step 290g and whose end 290h is screwed to a claw 290i. The claw 290i is installed with its base 290k in the other outer step 290l of the oblong 290d and can be rotated in this step 290l about the axis of the screw 290e so that the claw 290i can engage around the respective side of a bicycle fork from the inside or the outside. By moving the screw 290e of the oblong holes 290d it is possible to adapt to the various inside widths of the wheel forks, wherein an additional possibility for adaptation is given by rotating the claws 290e about the axis of the tightening screws 290e.

Figure 15:
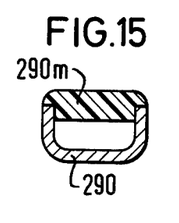
FIG. 15 a section along line XV—XV of FIG. 13.

According to FIG. 15 the U-stirrup 290 is constructed with a U-profile wherein this U-profile is closed by means a U-stirrup 290m which is T-shaped in the cross-section.

Figure 16:
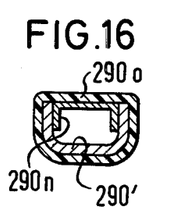
FIG. 16 a section along line XV—XV of FIG. 13 in another embodiment of the U-stirrup.

According to FIG. 16 the U-stirrup 290' is also U-shaped in the cross-section and closed by means of a U-shaped filler 290n which also has a U-cross-section. The entire U-stirrup 290' is sprayed with a plastic layer 290o.

Figure 17:
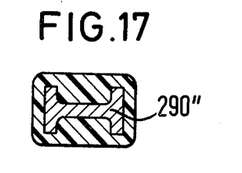
FIG. 17 a section along line XV—XV of FIG. 13 in a further modified embodiment of the U-stirrup.

According to FIG. 17 the U-stirrup 290" is constructed with a T-shaped cross-sectional profile and is also sprayed.

Figure 18:
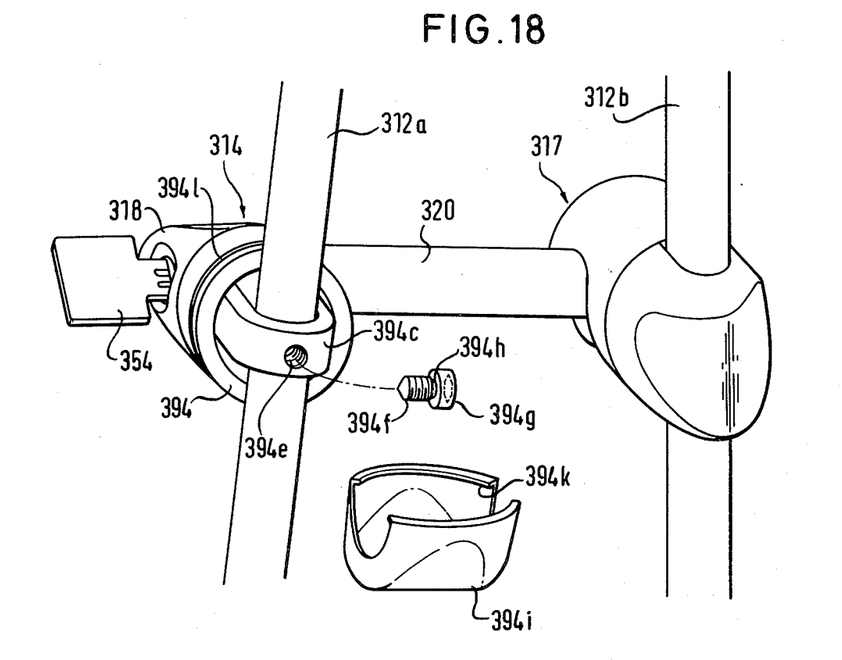
FIG. 18 another embodiment of a swiveling stirrup lock according to the invention in which the pivot bearing and the locking bearing are clamped individually to the side of a wheel fork.
Figure 19:
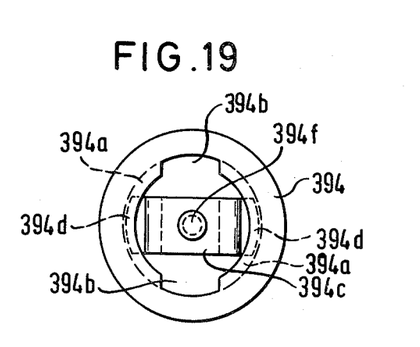
FIG. 19 a detail of FIG. 18.

In the embodiment according to FIG. 18 analogous parts are again provided with the same reference numbers as in FIG. 1, always adding 300. In this embodiment the pivot bearing 314 and the locking bearing 317 are clamped individually to the fork sides 312a and 312b as follows:

The pivot bearing 314 is provided with a fitting ring 394 which is intended for contact at the wheel fork side 312a. The inner periphery of the ring 394 has an undercut circumferential groove 394a which is cut at two diametrically opposite areas of claw insertion slots 394b. The wheel fork side 312a is held by a U-shaped clamp stirrup 394c at whose free side ends claws 394d are installed. The claws 394d engage, as evident in FIG. 19, into the undercut circumferential groove 394a. Assembly takes place in that, after placing the U-shaped clamp stirrup 394c at the wheel fork side 312a, the claw insertion slots 394b are brought into alignment with the claws 394d and the ring 394 is then pushed over the claws 394d until the claws 394d have reached the depth of the undercut groove 394a. Then the pivot bearing 394 can be rotated into the position shown in FIGS. 18 and 19 wherein then the claws 394d engage into the undercut circumferential groove 394a. Now a tightening screw 394f can be screwed into the threaded bore which is made in the bight of the U-shaped clamp stirrup 394c. This tightening screw rests against the wheel fork side 312a and effects bracing of the claws 394d with the undercut circumferential groove 394a. The tightening screw 394f has a socket head 394g which is connected with the threaded portion of the screw 394f by means of a weakening recess 394h. After a specific tightening has been accomplished, the socket head 394g breaks off under the effect of the tightening tools so that the clamping arrangement now can no longer be loosened.

The entire clamping arrangement can be covered with a cap 394i. This covering cap 394i is a molded part of plastic and has a locking bulge 394k. This locking bulge 394k can engage in an annular recess 394l at the pivot bearing 314.

The locking bearing 317 is attached in the same manner at the other wheel fork side 312b.

The swiveling stirrup lock is supplied with swiveling stirrups 320 of such a length that it corresponds approximately to the maximum inside width between the wheel fork sides 312a and 312b. In wheel forks with lesser inside widths the pivot bearing 314 and the locking bearing 317 in FIG. 18 are moved downwardly according to the downwardly diverging extension of the wheel fork sides 312a and 312b. If the uniform downward movement of those bearings 314 and 317 is not sufficient to adjust the horizontal distance of the bearing 314 and 317 to the greater length of the swiveling stirrup 320, then for instance the locking bearing 317 can be moved further down than the pivot bearing 314 whereby the distance between the bearings 314 and 317 is increased. In order to secure the correct interaction of the bearings 314 and 317 and the swivel stirrup 320, the bearings 314 and 317 can be rotated with respect to the U-shaped clamp stirrup 394c.

I claim:

1. A swiveling stirrup lock for a vehicle, particularly a two-wheel vehicle, comprising an axially elongated swiveling stirrup (20) which is supported at a frame portion (12a) laterally next to a wheel (10) provided with an opening and is swingable about a swivel axis (18) between a locking position in which said swiveling stirrup (20) penetrates the opening and is locked against swiveling and a driving position in which said swiveling stirrup (20) is not engaged with the wheel and is secured against swiveling, a pivot bearing means arranged to be attached to the frame portion (12a) with the swivel axis passing through said pivot bearing means, a swivel hub swingably mounted in said pivot bearing means so that it can swing around the swivel axis, said swiveling stirrup (20) is mounted in said swivel hub to be rotatable about an axis of rotation (22) substantially coinciding with the longitudinal axis of the stirrup, said axis of rotation being substantially perpendicular to said swivel axis, said swiveling stirrup includes a securing element (72), said pivot bearing means including a securing element receiving means (66), said swiveling stirrup is secured at least in said driving position by the engagement of said securing element (72) in said securing element receiving means, engagement and disengagement of said securing element (72) into and out of said securing element receiving means (66) being responsive to the rotation of said stirrup (20) about the axis of rotation thereof in opposite directions respectively, characterized in that said securing element (72) projects outwardly from the outer surface of said swivel hub, said pivot bearing means includes a plate member (14) extending substantially transversely of said swivel axis (18) and adjacent said swivel hub (16), and said securing element receiving means (66) located on said plate member (14) and extending in the axial direction of said swivel axis.

2. A swiveling stirrup lock according to claim 1, characterized in that a rotation prestressing element (60) prestresses said swiveling stirrup (20) about the axis of rotation (22) thereof in the direction towards the swivel movement securing rotational position.

3. A swiveling stirrup lock according to claim 2, characterized in that locking of said swivel hub (16) in the locking position is guaranteed by engagement of said rotation securing element (72) on said swiveling stirrup (20) in a rotation locking element mounting (70) formed on said securing element receiving means a locking bearing 17 disposed in spaced relation to and located opposite said pivot bearing means (14) and arranged to receive said swiveling stirrup (20) in the locking position when said swiveling stirrup is positioned through the opening of the wheel (10), a rotation lock (42) locks said swiveling stirrup (20) in a rotation locking position which corresponds to the engagement of said rotation securing element (72) in said securing element receiving means (60) and can only be rotated, optionally against the effect of said rotation prestressing element (60), after release of said rotation lock (42) for lifting said rotation securing element (72) out of said rotation locking element mounting (70) into a rotation release position.

4. A swiveling stirrup lock according to claim 3, characterized in that the rotation securing position of said swiveling stirrup (20) is locked by said rotation lock (42).

5. A swiveling stirrup lock according to claim 3 or 4, characterized in that said rotation lock comprises a lock cylinder (42) is supported in said swivel hub (16).

6. A swiveling stirrup lock according to claim 5, characterized in that a lock cylinder housing is held in said swivel hub (16), a cylinder core (56) is rigidly connected to said swiveling stirrup (20) for rotation therewith, said rotation prestressing element (60) comprises a helical torsion spring installed inside said swivel hub 16, said helical torsion spring being supported at one end at said swivel hub 16 and at the other end at said cylinder core (56).

7. A swiveling stirrup lock according to claim 5, characterized in that a key (54) for said lock cylinder (42) can be pulled out in the locking position and optionally in the driving position while locking said lock cylinder (42).

8. A swiveling stirrup lock according to claim 1, characterized in that when said swivel hub (16) has an outer surface of rotation extending around the swivel axis (18), said plate member (14) has an engagement wall (14b) in contact with said surface of rotation, and an edge of said engagement wall forming said securing element receiving means (66) and a rotation locking element mounting (70).

9. A swiveling stirrup lock according to claim 1, characterized in that said securing element (72) is formed by a recess (64) in said swiveling stirrup (20).

10. A swiveling stirrup lock according to claim 1, characterized in that said rotation securing element (172) is formed by a projection of said swiveling stirrup (120).

11. A swiveling stirrup lock according to claim 1, characterized in that a swivel prestressing element (24) prestresses said swivel hub (16) in the direction towards a swivel end position.

12. A swiveling stirrup lock according to claim 11, characterized in that said swivel hub (16) is prestressed in the direction towards the driving position.

13. A swiveling stirrup lock according to claim 11 or 12, characterized in that said swivel prestressing element (24) is enclosed between said pivot bearing means (14) and said swivel hub (16).

14. A swiveling stirrup lock according to claim 13, characterized in that said swivel hub forms a curved duct (16c), said swivel prestressing element (24) is formed by a spiral tension spring (24) held about the swivel axis (18) in said curved duct (16c), said spiral tension spring engages at one end said pivot bearing means (14) and at the other end said swivel hub (16).

15. A swiveling stirrup lock according to claim 14, characterized in that a loose anchoring part (32) located between said pivot bearing means (14) and said swivel hub (16), said swivel prestressing element (24) engages said loose anchoring part (32) at one end and engages in a form-locking manner with one of said pivot bearing means (14) and said swivel hub (16).

16. A swiveling stirrup lock according to claim 8, characterized in that a rotation prestressing element (56) is located within said swivel hub (16), a torsion member (60) is associated with said swiveling stirrup (20), said engagement wall (14) includes a curved section (68) and said swiveling stirrup (20) after being rotated out of the locking position and swiveling of said swivel hub (16) from the locking position is held on the following swivel path up to the driving position by said cuved sector 68 of said pivot bearing 14 which precedes said securing element receiving means (66) against the action of the rotation prestressing element (56) in such a way that said swiveling stirrup only after reaching the driving position jumps under the action of said torsion member (60) into the driving position while simultaneously said securing element (72) enters into said securing element receiving means (66), wherein the engagement of said securing element (72) into said securing element receiving means (66) under the action of said torsion member (60) supports the approach of said swiveling stirrup (20) towards the driving position.

17. A swiveling stirrup lock according to claim 8, characterized by a securing element (182, 184) in said stirrup (120), a locking mounting (117b, 117c) spaced from said pivot bearing means (114), said swiveling stirrup (120) after release of said securing element (172), (184) from said rotation locking element mounting (117b), (117c) during the swivel path of said swivel hub (116) from the locking position to the driving position can be returned by a rotation prestressing element (60) into the rotation securing position, and that said pivot bearing means (114) includes a rotation securing element stop (190) against which said securing element (172) strikes on the swivel path of said swiveling stirrup (120) before reaching the driving position in a stop position in which said swiveling stirrup (120) still engages in the opening of the wheel.

18. A swiveling stirrup lock according to claim 17, characterized in that said rotation element stop (190) is formed on said engagement wall (114b).

19. A swiveling stirrup lock according to claim 17 or 18, characterized in that, during the swiveling distance of said swiveling stirrup between the stop position and the driving position, an additional stable position is not possible because said rotation securing element (172) by engagement with one of said securing element receiving means (166) and said rotating securing element stop (190) under the effect of said rotation prestressing element (160) tries to swivel said swiveling stirrup (120) out of each intermediate position into the driving position or into the stop position in which it engages in the wheel.

20. A swiveling stirrup lock according to claim 1, characterized in that a locking bearing (17) is installed as a separate part from said pivot bearing means (14) at a different frame section (12b).

21. A swiveling stirrup lock according to claim 20, characterized by a latch (82) on the free end of said swiveling stirrup (20) said locking bearing (17) has a chamber with an inlet slot (17a, 17b) which permits passage of the free end (84) of said swiveling stirrup (20) only in the rotation release position, and a receiving space (17c) which, after passage of said free end (84) of said swiveling stirrup through said inlet slot (17a, 17b), permits a rotation of said latch at said free end, (84) of said swiveling stirrup, into a position which corresponds to the rotation locking position in which said latch (82) engages behind the boundary (17d) of said inlet slot (17a, 17b).

22. A swiveling stirrup lock according to claim 21, characterized by a flattened end of said swiveling stirrup at the free end thereof, said inlet slot (17a, 17b) is constructed in wo steps viewed in direction of said stirrup (20) in the locking position, with a first wider slot step closer to said swivel hub (16) which takes up the entire stirrup cross-section, and with an adjoining slot step (17b) which is further removed from said pivot bearing means and which permits passage only of the flattened end (84) of said swiveling stirrup which carries said latch (82).

23. A swiveling stirrup lock according to claim 22, characterized in that a receiving space (17c) located in said locking bearing (17) is wider in the longitudinal direction of said swiveling stirrup (20) in the locking position than said latch (82) in accordance with the distance fluctuations to be expected between said pivot bearing means (14) and said locking bearing (17).

24. A swiveling stirrup lock according to claim 3 or 20, characterized by an assembly connector which connects said pivot bearing means (14) with said locking bearing (17) and holds both of said bearing means and locking bearing (14, 17) in the relative position which corresponds to their operative coordination and does not hinder the fastening procedures during the attachment thereof at the frame portions.

25. A swiveling stirrup lock according to claim 24, characterized in that said assembly connector permits movement of said pivot bearing means and locking bearing with respect to each other in the sense of a distance variation.

26. A swiveling stirrup lock according to claim 3 or 20, characterized in that a U-stirrup (290) is arranged for fastening said pivot bearing means (214) and said locking bearing (217) to a wheel fork in such a way that said U-stirrup engages the wheel rim and is directed with its U-sides (290a, 290b) essentially to the wheel axle.

27. A swiveling stirrup lock according to claim 26, characterized in that said U-stirrup (290) is detachably fastenable at the wheel fork.

28. A swiveling stirrup lock according to claim 27, characterized in that said U-stirrup includes a U-bight (290c), fastening means (290e, 290i) for detachable fastening at the wheel fork are arranged in the region of said sides (290a, 290b) of said U-stirrup (290), wherein said fastening means (290e, 290i) are adjustable at at least one of said sides (290, 290b) in the direction of said U-bight (290c) to adjust to varying wheel fork widths.

29. A swiveling stirrup lock according to claim 28, characterized in that said sides (290a, 290b) of said U-stirrup (290) have oblong holes (290d) which extend in direction of said bight (290c) and arranged to hold said fastening means (290e, 290i) in a manner to be laterally adjustable.

30. A swiveling stirrup lock according to claim 29, characterized in that said fastening means (290e, 290i) include open claws arranged to engage the respective wheel fork side and clamping means (290e) for vertically adjusting said open claws with respect to the plane of said U-stirrup (290) and press said U-stirrup against the wheel fork side.

31. A swiveling stirrup lock according to claim 30, characterized in that said clamping means (290e) comprise tightening screws which penetrate said respective oblong hole (290d), and have a tool engagement (290f) at the free U-stirrup side, and are screwed to said claws (290i) at the wheel fork side.

32. A swiveling stirrup lock according to claim 31, characterized in that said claws (290i) including said tightening screws (290e) are rotatable 180° about the axis of respective tightening screw (290e).

33. A swiveling stirrup lock according to claim 26, characterized in that at least one of said pivot bearing means (214) and said locking bearing (217) are manufactured in one piece with said U-stirrup (290) of malleable cast iron.

34. A swiveling stirrup lock according to claim 32, characterized in that at least one of said pivot bearing means (214) and said locking bearing (217) are attached to said U-stirrup (290) by welding.

35. A swiveling stirrup lock according to claim 34, characterized in that said U-stirrup (290) and at least one of said pivot bearing means (214) and said locking bearing (217) are sprayed with plastic.

36. A swiveling stirrup lock according to claim 35, characterized in that said U-stirrup (290'') has a double T-shaped cross-section.

37. A swiveling stirrup lock according to claim 35, characterized in that said U-stirrup (290') has a U-shaped cross-section.

38. A swiveling stirrup lock according to claim 37, characterized in that the U-shaped cross-section of said U-stirrup is filled by means of a filler (290m) which extends in a U-shape.

39. A swiveling stirrup lock according to claim 38, characterized in that said filler (290n) which extends U-shaped has a U-shaped cross-section.

40. A swiveling stirrup lock according to claim 38, characterized in that said filler (290m) which extends U-shaped has a T-shape cross-section.

41. A swiveling stirrup lock according to claim 3 or 20, characterized by a clamping arrangement for securing at least one of said pivot bearing means (314) and said locking bearing (317) at always one side (312a or 312b) of a wheel fork.

42. A swiveling stirrup lock according to claim 41, characterized in that said clamping arrangement includes a U-shaped clamp stirrup (394c) having at its free side ends claws (394d) to hook into undercuts (394a) in at least one of said pivot bearing means (314) and said locking bearing (317), and a threaded bore (394e) at the top of said U-shaped clamp stirrup (394c) for receiving a tightening screw (394f) so that it can be pressed against the respective wheel fork side (312a) in such a way that said claws (394d) are braced by said undercuts (394a).

43. A swiveling stirrup lock according to claim 42, characterized in that one of said pivot bearing means (314) and said locking bearing (317) has a contact ring (394) which faces the respective side (312a) or (312b) for contact at the respective fork side, and that said contact ring (394) has at its inside said undercut (394a) with diametricaly opposite claw insertion slots (394b) in such a way that said claws (394d) can be inserted in the region of said claw insertion slots (394b) up to the depth of said undercuts (394a) in said contact ring (394), and that one of said pivot bearing means (314) and said locking bearing (317) can be rotated hereon with respect to said U-shaped clamp stirrup (394c) wherein said claws (394d) engage into said undercuts (394a).

44. A swiveling stirrup lock according to claim 43, characterized in that a tool engagement portion (394g) of a tightening screw (394f) of said clamping arrangement can reak off due to the torque which occurs during tightening.

45. A swiveling stirrup lock according to claim 44, characterized in that for adaptation of said swiveling stirrup to different wheel fork widths said pivot bearing means (314) and said locking bearing (317) can be fixed at varying distance with respect to the wheel axle and at least one of said pivot bearing means and locking bearing can be fixed in the plane of the wheel fork in different angular positions in such a way that said swiveling stirrup (320) aligns with said locking bearing (314) in the locking position.

46. A swiveling stirrup lock according to claim 45, characterized by a cap (394i) for covering said clamping arrangement which snaps onto one of said pivot bearing means (314) and said locking bearing (317).

47. A swiveling stirrup lock according to claim 1, wherein said plate member (14) is substantially circular about the swivel axis (18).

48. A swiveling stirrup lock according to claim 1, wherein said plate member (14) is cup-shaped and comprises a bottom wall (14a) and a side wall (14b) extending outwardly from said bottom wall.

49. A swiveling stirrup lock according to claim 48, wherein said securing element receiving means are located on the edge of said side wall (14b) spaced outwardly from said bottom wall.

50. A swiveling stirrup lock according to claim 6, characterized in that a key (54) for said lock cylinder (42) can be pulled out in the locking position and optionally in the driving position while locking said lock cylinder (42).

51. A swiveling stirrup lock as set forth in claim 1, characterized in that the swiveling stirrup is provided with a locking element (84, 82) at the end of said stirrup (20) remote from said swivel hub (16), said locking element (84, 82) cooperating in said locking position of said stirrup (20) with a locking element receiving means (17), said locking element receiving means (17) being provided on a further frame portion (12b) opposite to said first-mentioned frame portion (12a) across said opening of said wheel, said locking element (84, 82) being rotatable with said stirrup (20) between a swivel movement locking rotational position, in which said locking element (84, 82) is prevented from disengagement with said locking element receiving means (17) and a swivel movement releasing rotational position, in which said locking element (84, 82) is disengageable from said locking element receiving means (17), a rotation locking unit (42) being provided in said swivel hub (16) for locking said stirrup (20) in said swivel movement locking rotational position.

52. A swiveling stirrup lock as set forth in claim 1, said securing element (22) acting also as a locking element locking said stirrup (20) in said locking position, said bearing means (14) comprising further securing element receiving means (70) angularly offset with respect to said first-mentioned securing element receiving means (66) about said swivel axis, said stirrup (20) being rotatable into a swivel movement locking rotational position, in which said securing element (72) engages said further securing element receiving means (70), a rotation locking element (42) being provided in said swivel hub (16) for locking said stirrup (20) in said swivel movement locking rotational position.

53. A swiveling stirrup lock as set forth in claim 52, a securing element supporting track (68) extending in said bearing means (14) between said securing element receiving means (66) and said further securing element receiving means (70), said stirrup (20) being biased towards said swivel movement locking rotational position by a rotation prestressing element (60), said securing element (70) sliding upon said securing element supporting track (68), when said stirrup (20) is swiveled from said locking position towards said driving position, such that on arrival of said stirrup (20) in said driving position said securing element (72) automatically falls from said securing element supporting track (68) into said securing element receiving means (66) under the action of said rotation prestressing element (60).

54. A swiveling stirrup lock as set forth in claim 2, said pivot bearing means (114) being provided with an abutment (1909 adjacent said securing element receiving means (166), said securing element (172) abutting said abutment (190) when said stirrup (1209 is swiveled from said locking position towards said driving position before said securing element (172) can enter into said securing element receiving means (166), said engagement of said securing element (172) and said abutment (190) defining an intermediate position of said stirrup (120) between its locking position nd its driving position, said wheel being still locked in said intermediate position, said securing element (172) becoming free to enter into said securing element receiving means (166) only after manually rotating said stirrup (120) away from said swivel movement securing rotational position against the action of said rotation prestressing element (160).

55. A swiveling stirrup lock as set forth in claim 1, said swivel hub having a substantially circular periphery about said swivel axis.

56. A swiveling stirrup lock as set forth in claim 55, said plate member (14) being cup-shaped with a substantially circular bottom wall (14a) and a side wall (146) substantially following the circular periphery of said swivel hub.

57. A swiveling stirrup lock as set forth in claim 55, said swivel hub having an end face remote from said plate member (14), which end face is curved about an axis substantially coincident with the longitudinal axis of said stirrup (20).

58. A swiveling stirrup lock for a vehicle, particularly a two-wheel vehicle, comprising an axially elongated swiveling stirrup (120) which is supported at a frame portion (112a) laterally next to a wheel provided with an opening and is swingable about a swivel axis between a locking position in which said swiveling stirrup (120) penetrates the opening and is locked against swiveling and a driving position in which said swiveling stirrup (120) is not engaged with the wheel and is secured against swiveling, a pivot bearing means (114) arranged to be attached to the frame portion (112a) with the swivel axis passing through said pivot bearing means (114), a swivel hub (116) swingably mounted in said pivot bearing means (114) so that it can swing around the swivel axis, said swiveling stirrup (120) is mounted in said swivel hub (116) to be rotatable about an axis of rotation, said axis of rotation being substantially perpendicular to said swivel axis, said swiveling stirrup (120) includes a securing element (172), said pivot bearing means (114) including a securing element receiving means (166), said swiveling stirrup (120) is secured at least in said driving position by the engagement of said securing element (172) in said securing element receiving means (166), engagement and disengagement of said securing element (172) into and out of said securing element receiving means (166) being responsive to the rotation of said stirrup (120) about the axis of rotation thereof in opposite directions respectively, a rotation prestressing element prestressing said swiveling stirrup (120) about the axis of rotation thereof in the direction towards a swivel movement securing rotational position, said pivot bearing means (114) being provided with an abutment (190) adjacent said securing element receiving means (166), said securing element (172) abutting said abutment (190) when said stirrup (120) is swiveled from said locking position towards said driving position before said securing element (172) can enter into said securing element receiving means (166), said engagement of said securing element (172) and said abutment (190) defining an intermediate position of said stirrup (120) between its locking position and its driving position, said wheel being still locked in said intermediate position, said securing element (172) becoming free to enter into said securing element receiving means (166) only after manually rotating said stirrup (120) away from said swivel movement securing rotational position against the action of said rotation prestressing element (160).

* * * * *